United States Patent [19]

Goukassian

[11] Patent Number: 5,848,118
[45] Date of Patent: Dec. 8, 1998

[54] METHOD AND APPARATUS FOR DETECTING INHOMOGENEITIES IN SEAT ASSEMBLIES

[75] Inventor: Samvel Goukassian, Livonia, Mich.

[73] Assignee: Lear Corporation, Southfield, Mich.

[21] Appl. No.: 878,655

[22] Filed: Jun. 19, 1997

[51] Int. Cl.[6] .................................................. G01B 15/06
[52] U.S. Cl. ............................................... 378/58; 378/55
[58] Field of Search ................................ 378/51, 53, 54, 378/55, 58

[56] References Cited

U.S. PATENT DOCUMENTS

| | | | |
|---|---|---|---|
| 2,763,787 | 9/1956 | Jacobs | 378/58 X |
| 3,691,940 | 9/1972 | Hays et al. | 378/55 X |
| 3,786,268 | 1/1974 | Nomura . | |
| 4,165,461 | 8/1979 | Ishijima . | |
| 4,415,980 | 11/1983 | Buchanan . | |
| 4,542,520 | 9/1985 | Nelson . | |
| 4,549,306 | 10/1985 | Shideler et al. . | |
| 4,581,534 | 4/1986 | Todokoro et al. . | |
| 4,582,993 | 4/1986 | Bhattacharya et al. . | |
| 4,841,554 | 6/1989 | Doenges et al. . | |
| 4,871,912 | 10/1989 | Kokubo et al. . | |
| 4,894,541 | 1/1990 | Ono . | |
| 5,040,200 | 8/1991 | Ettinger et al. . | |
| 5,177,779 | 1/1993 | Cornu et al. . | |
| 5,255,302 | 10/1993 | Shimamune et al. | 378/55 |
| 5,541,856 | 7/1996 | Hammermeister | 378/58 X |

*Primary Examiner*—David P. Porta
*Attorney, Agent, or Firm*—Brooks & Kushman P.C.

[57] ABSTRACT

A method and apparatus is provided for inspection in real-time of inhomogeneities at particular locations of objects using x-radiation. An object is fixed on a conveyor by a system of clamps, and a manipulator positions an x-ray source and detector such that the particular location to be inspected is between the two. X-ray photons passing through the spot to be inspected are recorded by the detector. When the manipulator is at the required position, the electronic control system (ECS) gives a 'start' signal and the monitor begins to count the pulses from the detector. After a specified time, a 'stop' signal passes from the ECS, and the monitor stops counting, while the manipulator passes to the following position to be inspected. The information coming from the detector is processed in the monitor. If no inhomogeneities are detected, the monitor gives permission for inspection of the following object, otherwise an alarm signal is triggered.

6 Claims, 3 Drawing Sheets

METHOD AND APPARATUS FOR DETECTING INHOMOGENEITIES IN SEAT ASSEMBLIES

TECHNICAL FIELD

The present invention relates to a method and apparatus for detecting the presence or absence of parts in a particular location in a seat assembly.

BACKGROUND OF THE INVENTION

Vehicle seat assemblies typically comprise various structural, operational, and trim components secured together by various means, such as bolts. Such bolts are often positioned within the underbody of the seat assembly. Due to such positioning of the bolts underneath the seat assembly, inspection to assure the presence of such bolts may be difficult.

In certain seat assembly operations, the seat assembly must be fully inspected just prior to placement on a pallet for shipment. This inspection comprises turning the seat assembly over to assure the presence of various bolts required in the assembly. This is a very time-consuming and cumbersome process. Accordingly, other methods have been developed for assuring the presence of attachment bolts in the seat assembly, such as the use of torque wrenches which are connected to a programmable logic controller (PLC). In this method, the desired torque level is reached, a signal is sent to the PLC accordingly to count the presence of that particular bolt in the assembly process. In this manner, the presence of such bolts may be guaranteed by monitoring the torque levels of the torque wrench, and only allowing conveyor movement, or fixture disengagement, when the appropriate torque level has been reached the required number of times to indicate the installation of the required number of assembly bolts.

The use of a torque wrench connected to a PLC for assuring the presence of bolts may not be particularly desirable in certain assembly operations due to high cost or assembly inconvenience. Accordingly, the development of other methods of bolt detection is desirable.

Radiographic defectoscopes are used for the detection and analysis of x-radiation passing through an object, and are not desirable for seat assembly bolt detection. Depending on the object being studied and the nature of the inhomogeneities, x-radiation of different energy and intensity is used, along with different detectors and methods of analysis. Depending on the method of analysis, defectoscopes can be divided into two basic groups: sensing and computation of x-ray photons passing through the object, or visualization of these photons. The first method is coarser and gives information based only on the presence or absence of inhomogeneities. As an example of this group, U.S. Pat. No. 4,582,993 describes a method and apparatus for detecting voids on the surface or interior of metal rolled stock which is moving continuously on rolling machines. On one side of the rolled stock is placed a source of x-rays, and on the other an x-ray detector. The x-ray photons passing through the stock are registered by the detector. If, during a specific sensing period, the count exceeds the limit of a mean square fluctuation, the presence of a void is recorded.

The second defectoscope method is much more informative. It provides a picture of the inhomogeneity, such as in U.S. Pat. No. 4,415,980. In the '980 patent disclosure, the object as a whole is subject to x-radiation. On the opposite side from the x-ray source is a radiographic optical electronic system for visualizing the x-rays passing through the object. This method requires a more complicated and more expensive detecting and analyzing apparatus, as well as a more intense source of x-rays. However, in some assemblies, it is extremely complicated and difficult to find inhomogeneities by subjecting the object as a whole to inspection. For instance, if the object is very large and of a complex shape, and the inhomogeneities are located in the interior portions of the object and are surrounded by massive parts of complex shapes, the inspection can be very difficult. Such an inspection is complicated by the fact that the massive and complexly shaped parts of the object are sources of noise for the detector, and often the level of noise is many times the level of the signal. In this situation, neither of the above-described methods can be used.

Accordingly, it is desirable to provide a method and apparatus for detecting inhomogeneities in a part or assembly with a complex shape in which the shortcomings of prior art inspection devices are overcome.

DISCLOSURE OF THE INVENTION

The present invention overcomes the above-referenced shortcomings of prior art inspection devices by providing a method and apparatus in which a relatively small movable emitter and movable detector are positioned on opposing sides of a particular location to be sensed. The emitter emits detectable energy pulses toward the particular location, and the detector senses the pulses once they have passed through the particular location. In this manner, the level or frequency of energy pulses sensed by the detector can be used in determining whether a part is present in the particular location. Preferably, the movable emitter and detector are positioned on movable arms to facilitate positioning these components closely adjacent and on opposing sides of the particular location to be inspected.

More particularly, the present invention is intended for detecting inhomogeneities at particular locations in a large complex-shaped object when it is not possible to inspect the particular locations by inspecting the entire object as a whole. To accomplish this task, an x-ray source and detector are mounted on a manipulator. The manipulator places the x-ray source and detector into a position which is suitable for inspection of the particular location by positioning the x-ray source and detector on opposing sides of the particular location to be inspected closely adjacent the particular location. When the device is activated, the count of photons passing through the particular location to be inspected is processed. After the inspection of this particular location is completed, the manipulator moves the x-ray source and detector to the next position to be inspected. Because only particular pre-specified portions of the object are inspected, this makes it possible to use a less complex and cheaper detecting and positioning apparatus, which reduces the required energy and intensity of the x-ray source, and minimizes noise.

The present invention further provides a method for detecting the presence or absence of parts in a particular location in an assembly. The method includes positioning a movable emitter and movable detector on opposing sides of the particular location. The detector is then operated to detect the level or frequency of energy emissions from the emitter at the opposing side of the particular location. The detected level of emissions is then utilized to determine whether a part is present in the particular location.

Accordingly, an object of the present invention is to provide an inexpensive and accurate method and apparatus for inspecting complex-shaped assemblies for determining the presence or absence of parts in a particular location.

A further object of the present invention is to provide a method and apparatus for inspecting assemblies in a manner in which energy requirements are reduced in comparison to prior art inspection devices.

The above objects and other objects, features, and advantages of the present invention are readily apparent from the following detailed description of the best mode for carrying out the invention when taken in connection with the accompanying drawings.

DETAILED DESCRIPTION OF THE PREFERRED EMBODIMENTS

Figure 1:
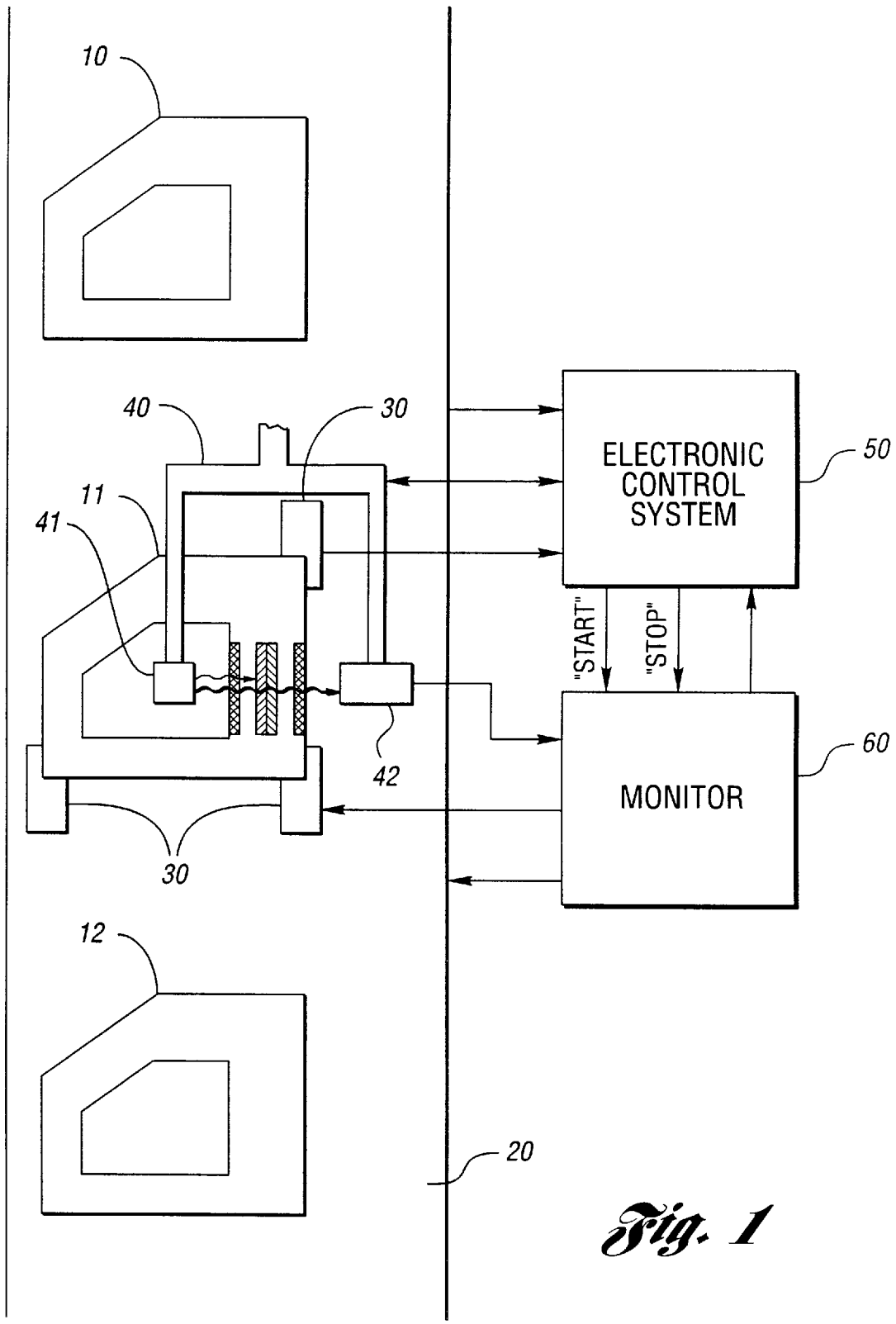
FIG. 1 schematically illustrates the method and apparatus for inspecting complex assemblies in accordance with the present invention.

Referring to FIG. 1, the seat assemblies to be inspected (10, 11, 12) are positioned on a conveyor 20. At a particular spot on the conveyor 20, the next seat assembly in line, for example seat assembly 11, is attached by a system of clamps 30 in a specific position. At that point, a signal passes from the conveyor 20 and from the system of clamps 30 to an electronic control system (ECS) 50 concerning the readiness of the seat assembly for inspection. The ECS 50 gives a command to the manipulator 40, and the latter places the x-ray source 41 and the detector 42 at the first of the positions to be inspected and sends a signal to the ECS 50 concerning the readiness of the object to be inspected.

When signals from the conveyor 20, the clamping system 30, and the manipulator 40 are present, the ECS sends a 'start' signal to the monitor 60, and the monitor begins to count the pulses entering from the detector 42. After a predetermined period of time, a 'stop' signal passes from the ECS 50 to the monitor 60. The count obtained is recorded in the monitor 60. After this, the ECS 50 sends the manipulator 40 a command to move for inspection of the next position. After inspection of the last position, the monitor 60 compares the count obtained from the detector 42 with a pre-specified number. If these numbers coincide within the limits of statistical error of measurement, then the ECS 50 gives permission to the conveyor 20 and the clamping system 30 to move on for inspection of the next seat assembly. Otherwise, the monitor 60 emits a signal indicative of the presence of inhomogeneities, and writes the numbers of the positions where there are inhomogeneities. The time interval between the 'start' and 'stop' signals is chosen separately for each position such that when there are no inhomogeneities, the count is the same for any position. This facilitates processing of the data, in that it makes it possible to enter only one standard number for comparison and one mean square error of measurement.

Figure 2:
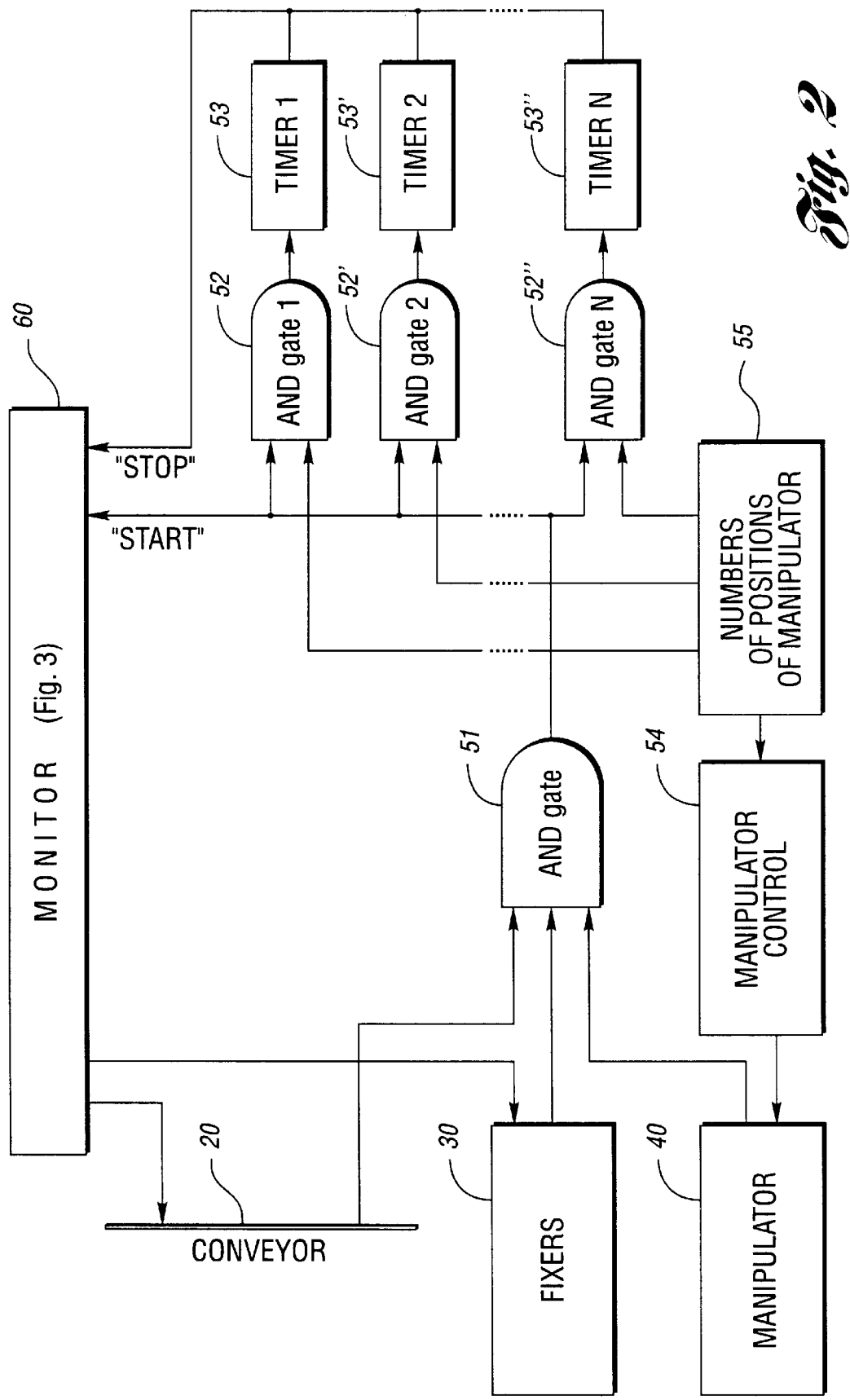
FIG. 2 shows a block diagram of an electronic control system in accordance with the present invention.

FIG. 2 shows a block diagram of the components of the ECS 50. The signals from the conveyor 20, the clamping system 30, and the manipulator 40 enter at the 'AND gate' 51. If all three signals are present at the output of the 'AND gate' 51, a 'start' signal goes to the monitor 60 and to a system of 'AND gate's 52, each of which corresponds to one position of the manipulator 40. At the same time, from block 55, where the numbers of the positions of the manipulator 40 are stored, a signal passes to the 'AND gate' 52 which corresponds to the position at which the manipulator 40 is located at that moment. The output signal from this 'AND gate' 52 then enters the corresponding timer 53, and is retained for the time needed for inspection of the given position. The routine signal enters the monitor 60 as a 'stop' signal. Thus, the monitor 60 is placed into readiness for receiving and processing signals coming from the detector 42.

Figure 3:
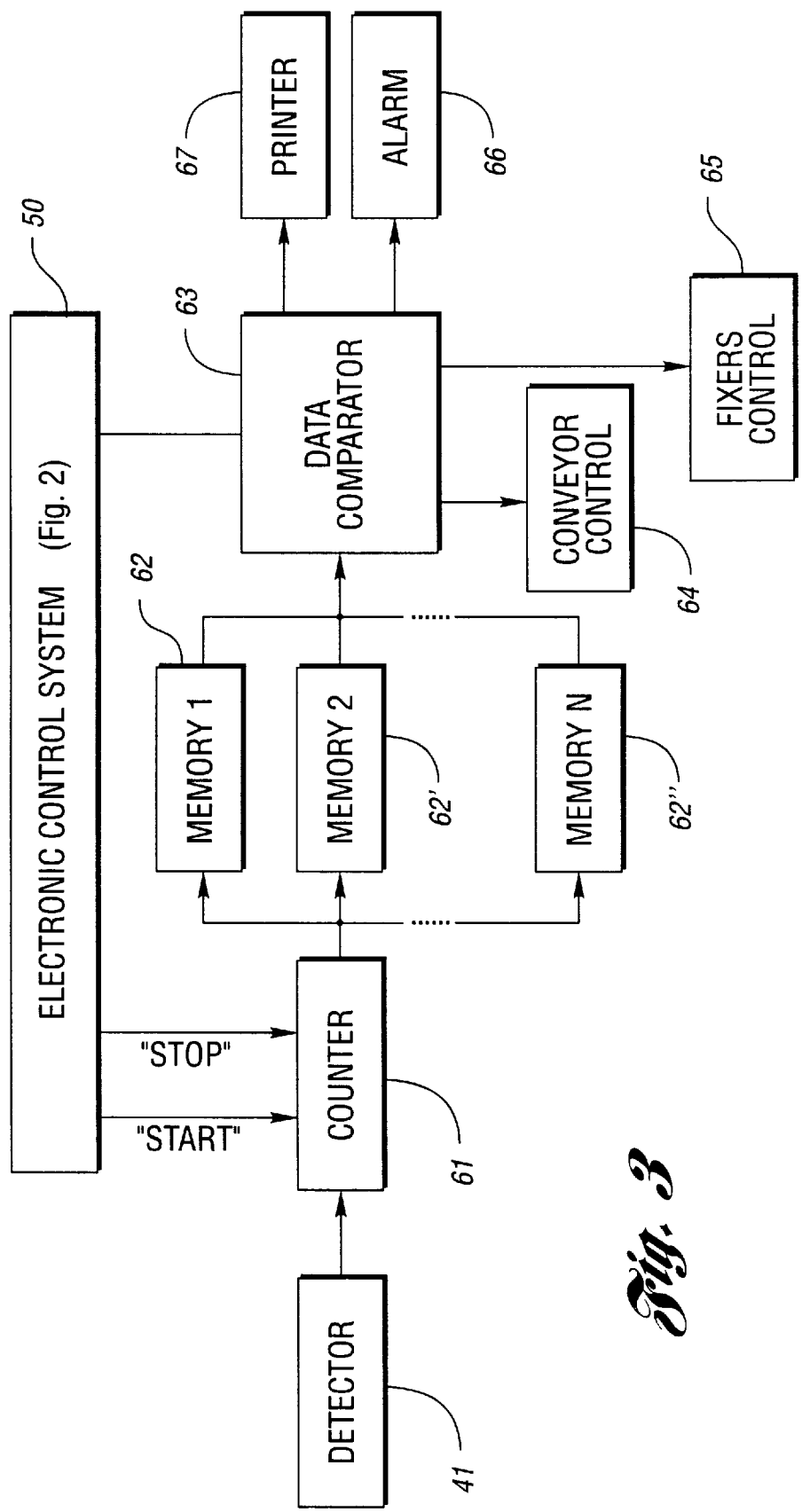
FIG. 3 shows a block diagram of monitor components in accordance with the present invention.

FIG. 3 shows a block diagram of the components of the monitor 60. The pulses from the x-ray detector 42 continuously enter the counter 61. The counter 61 counts only for the time period between the 'start' and 'stop' signals. The count from the counter 61 enters the memory system in the memory location (62, 62', 62") which corresponds to the given position of the manipulator 40.

After inspection of the last position, the count from the memory 62 enters the data comparator 63, where it is compared with a pre-specified number. If these numbers coincide, then a command signal is sent from the data comparator 63 to the conveyor control 64 and the 'fixers' control 65 to pass on to inspection of the next seat assembly (10, 11, 12). Otherwise, the signal goes to 'alarm' 66 and to the 'printer' 67, where the numbers of the seat assembly and the position where the inhomogeneity was found are recorded. If inspection must be done manually, blocks 54 and 55 are eliminated from the block diagram of the ECS 50 (see FIG. 2). The number of the position of the manipulator 40 is taken manually and then the signal goes to the appropriate 'AND gate' 52. After this, the manipulator 40 is switched manually to the given position and the 'start' button is pressed, and then a signal passes to the 'AND gate' 51 upon the readiness of the given position for inspection. The remainder of the electronic system operates the same as in automatic mode.

As described above, this invention may be used, for example, for determining the presence of a bolt in a particular location within an automobile seat at the final stage of manufacture when all the bolts are hidden by the upholstery or by plastic panels. The absence of a bolt at any position is considered an inhomogeneity in this position. These bolts may be located throughout the seat at various levels, and surrounded by massive, complex-shaped metal parts. Detecting the presence of these bolts by subjecting the entire seat to inspection is therefore extremely complicated and unreliable. This requires an expensive and large coordinate-sensitive detector, a complex electronic system, and a powerful high energy source of x-rays. The latter, in turn, imposes additional costs because of Compton scattering, and complicates the protection of operators in the inspection location against radiation.

According to the present invention, inspection is done only of those parts of the seats where the bolts are located. The manipulator brings the x-ray source and detector to the bolt to be inspected in such a way that the axis of the bolt is approximately within an accuracy of +1 inch on the line joining the source with the detector.

The energy of the x-ray photons is chosen such that they pass almost all the way through the upholstery and the various plastic panels covering the bolts and such that errant photons are mostly absorbed in the materials of the seat carcass.

The ratio of count rates of the detector in the absence vs. count rate in the presence of a bolt is greatest when the bolt is missing, i.e., a large number of x-ray photons passes through the opening of a missing bolt. This simplifies analysis of the data obtained, increases the reliability of the inspection, reduces the accuracy needed for setting the manipulator at a given position, and makes it possible to minimize the intensity and energy of the x-ray source. This configuration also reduces the cross-section of Compton scattering, and facilitates protection of people from the radiation.

For example, as with the x-ray source, one can select a radioactive isotope of cadmium, $Cd^{109}$ with an intensity of approximately 2nCi and a photon energy of 88 keV. Using this source, the count in the absence of the bolt is several tens of times that in the presence of the bolt, while the mean square deviation of the count is several percent with an exposure time of approximately one second.

Furthermore, the cross-section of Compton scattering is practically zero relative to the cross-section of photoabsorption, and protection from radiation is adequately provided by metal shields several millimeters thick or by lead shields a fraction of a millimeter thick.

This design significantly reduces the weight, reduces the size of the source-detector system, and makes it safe for use manually with the manipulator, with the same electronic system for data processing. The detector can comprise almost any x-ray detector (GM, semiconductor, scintillation, etc.) with an active diameter of approximately 1–2 inches. The manipulator could comprise a manipulator used for automatic point welding in automobile products by replacing the electrode with an x-ray source and a detector.

While the best mode for carrying out the invention has been described in detail, those familiar with the art to which this invention relates will recognize various alternative designs and embodiments for practicing the invention within the scope of the appended claims.

What is claimed is:

1. A method for detecting the presence or absence of parts in a particular location in an assembly to be inspected, wherein the assembly has a complex shape, the method comprising:

positioning a movable emitter including a radioactive isotope of cadmium and movable detector on opposing sides of the particular location, such that at least one of the emitter and detector is positioned within the assembly;

operating the emitter to emit detectable energy toward the particular location;

operating the detector to detect the level of energy emissions from the emitter at the opposite side of the particular location; and utilizing the detected level of emissions to determine whether a part is present in the particular location.

2. The method of claim 1, wherein said positioning of a movable detector comprises positioning an x-ray detector.

3. An apparatus for detecting the presence or absence of parts in a particular location in an assembly to be inspected, wherein the assembly has a complex shape, comprising:

a first movable arm having an x-ray source including a radioactive isotope of cadmium disposed thereon for emitting detectable x-ray pulses; and a second movable arm having a detector thereon for receiving the x-ray pulses;

wherein the first and second arms are configured to move the x-ray source and detector to positions at opposing sides of the particular location such that at least one of the emitter and detector is positioned within the assembly and the x-ray source may emit x-ray pulses toward the particular location and the detector will receive the x-ray pulses after they pass through the particular location, whereby the pulses received may be counted to determine the presence of a part in the particular location which would at least partially inhibit the movement of pulses through the particular location.

4. The apparatus of claim 3, wherein said detector comprises an x-ray detector.

5. The apparatus of claim 3, further comprising a manipulator operative to move said first and second arms.

6. The apparatus of claim 3, further comprising an electronic control system electrically connected with the detector for counting x-ray pulses detected by the detector.

* * * * *